Jan. 6, 1942.  S. A. FORTER  2,268,546
GLASS FURNACE
Filed Oct. 6, 1938   4 Sheets-Sheet 4
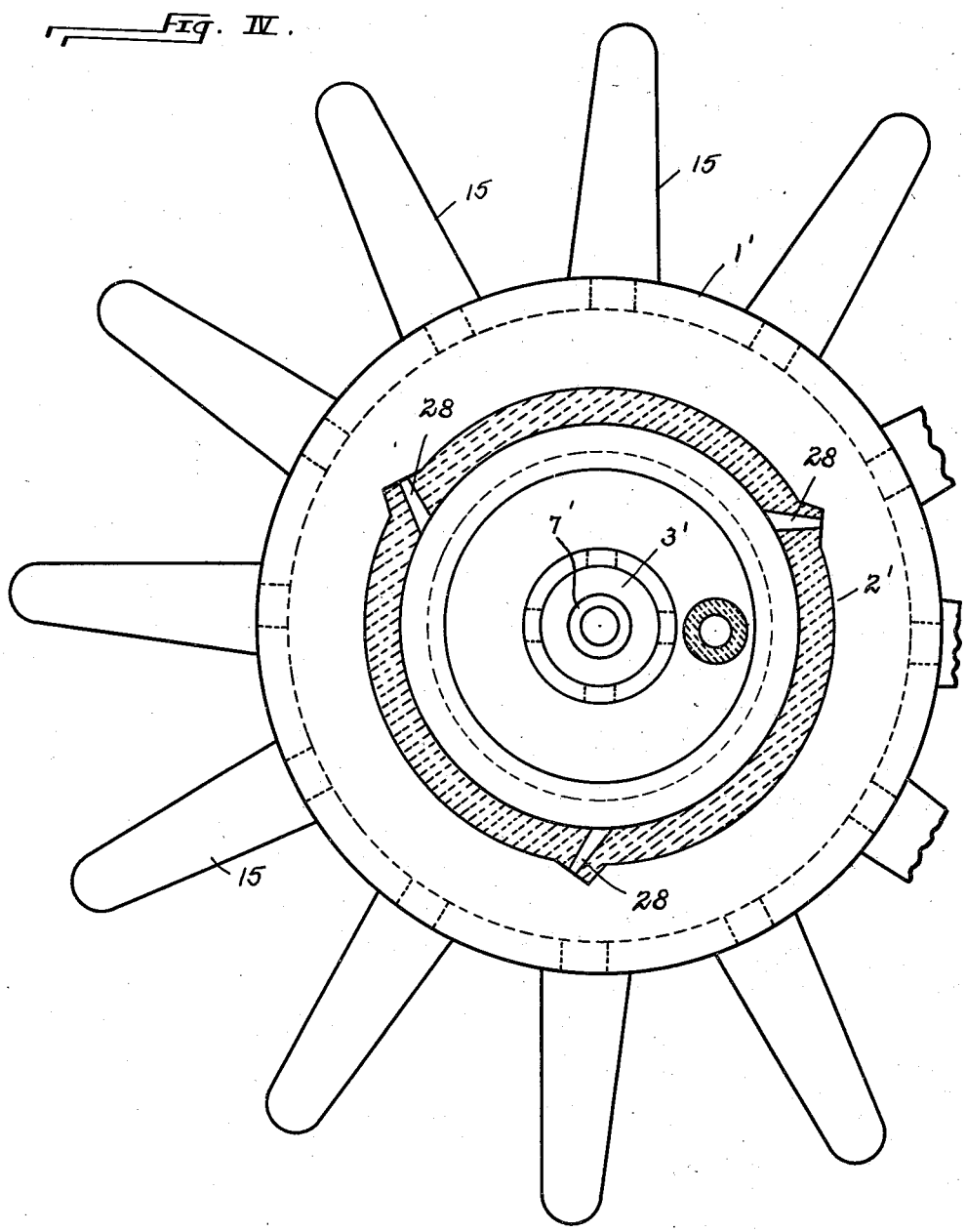
Fig. IV.
INVENTOR
Samuel A. Forter
by Christy and Wharton
attorneys Patented Jan. 6, 1942

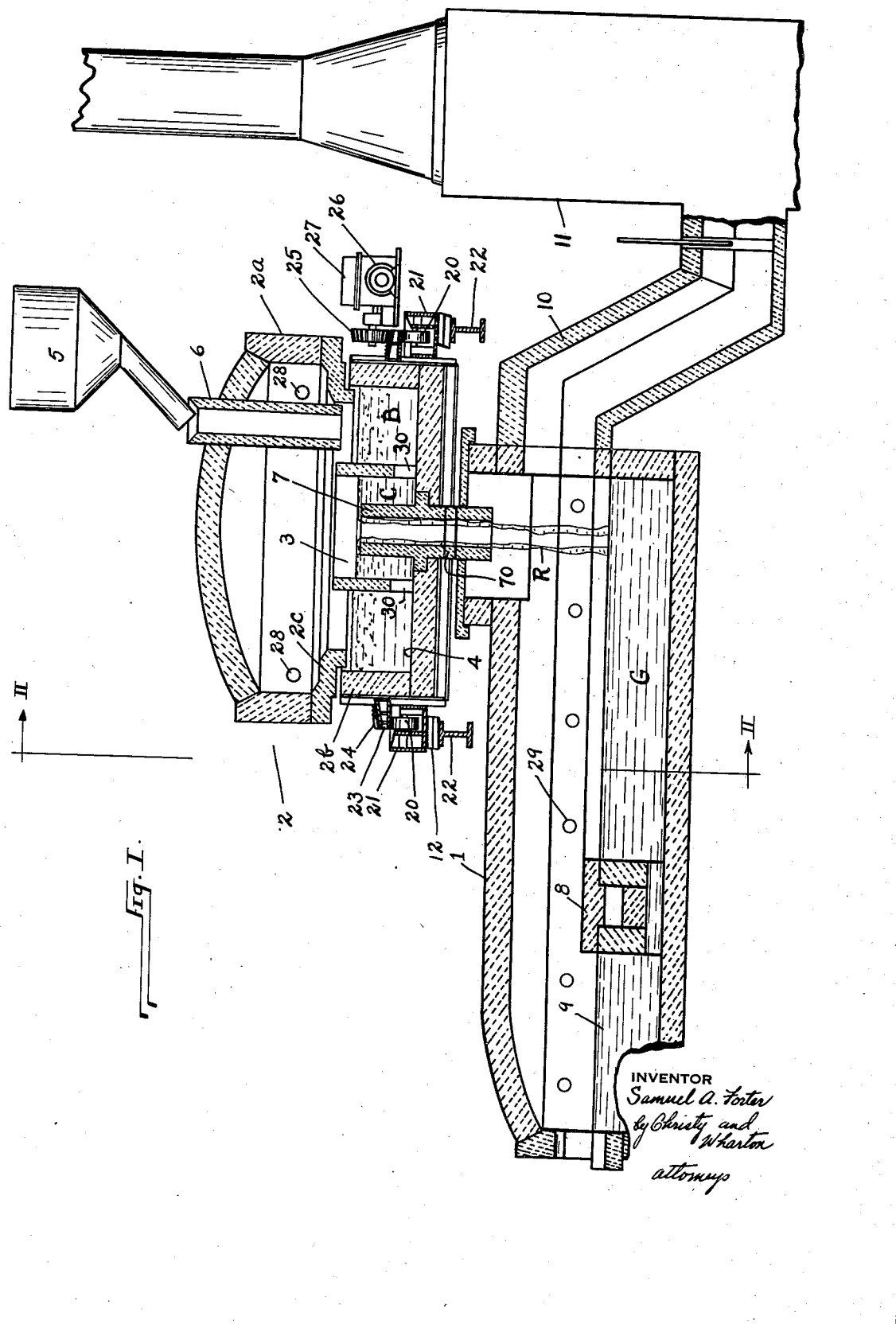

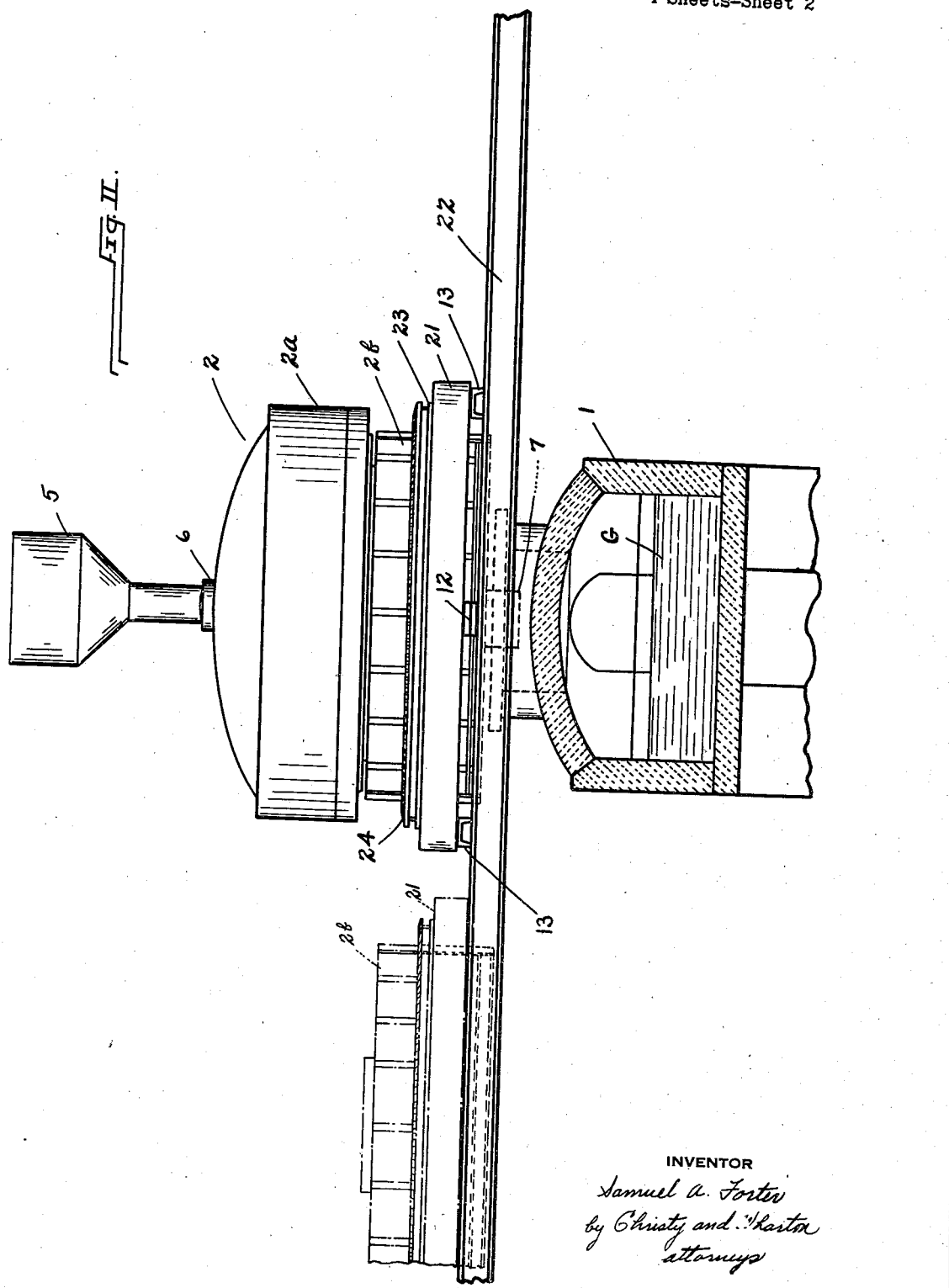

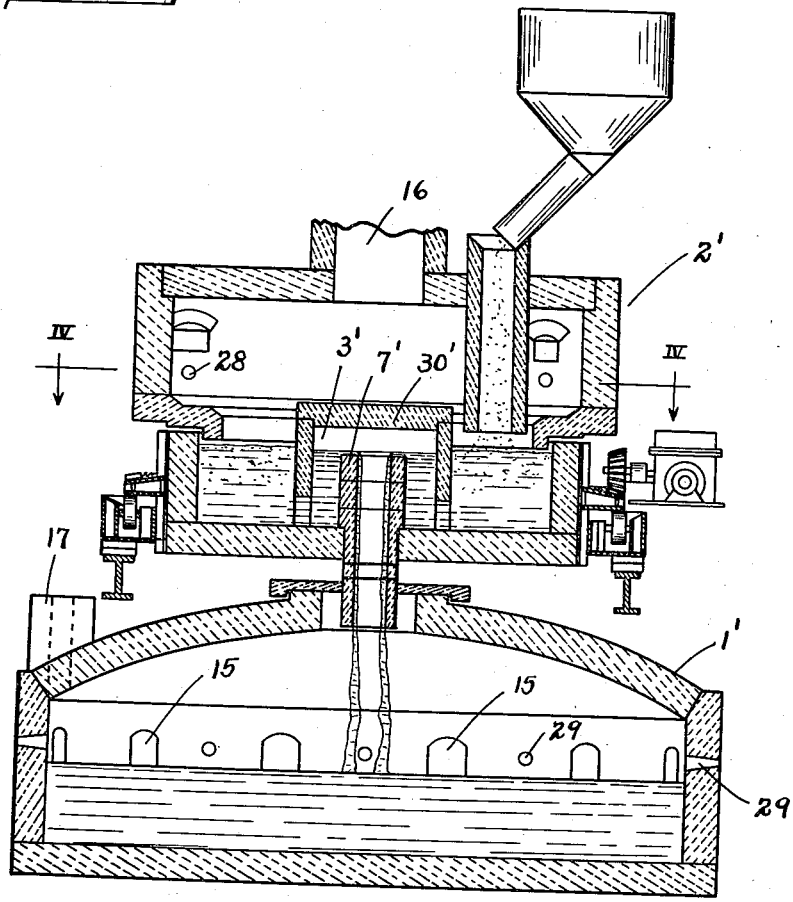

2,268,546

UNITED STATES PATENT OFFICE 2,268,546

GLASS FURNACE

Samuel A. Forter, Avalon, Pa., assignor to Forter-Teichmann Company, a corporation of Pennsylvania Application October 6, 1938, Serial No. 233,601

6 Claims. (Cl. 49—54)

The invention relates to glass furnaces, and consists in refinements and elaborations in furnace construction.

The object of the invention is to prepare molten glass in better condition for blowing, drawing, or molding.

It is further my aim to obtain greater production from a furnace of given size, and to minimize the factory floor space required for a furnace of given capacity.

Again, I seek to minimize the loss of time and cost of labor incident to shut-downs for furnace repair. Still other objects will appear in the ensuing specification.

In the accompanying drawings Fig. I is a view in vertical section of a furnace that in exemplary way embodies the invention; Fig. II is a view on the plane II—II of Fig. I, illustrating the furnace partly in side elevation and partly in vertical section; Fig. III is a view comparable with Fig. I, illustrating a few of the modifications that are permissible within the scope of the invention; and Fig. IV is a fragmentary view, showing the modified structure, partly in plan and partly horizontal section, on the plane IV—IV of Fig. III.

The usual glass furnace includes a melting chamber and a refining chamber. The glass-forming materials are introduced to the melting chamber, and in such chamber are reduced to crude molten glass. This crude glass flows into the refining chamber, and in such refining chamber, as the name signifies, the crude glass is refined and purified, that is to say, is conditioned for the usual drawing, molding or blowing operations.

In the furnace in which my invention is embodied, the melting chamber is positioned above the refining chamber. In Fig. I the reference numeral 1 is applied to the refining chamber and 2 to the melting chamber. The refining chamber is of conventional rectangular shape in plan, and the melting chamber is preferably of circular shape in plan. It is needless to involve this specification with details of construction that the engineer will understand, and suffice it to say that, other than as hereinafter specified, the furnace is built of refractory blocks, laid up with fireproof mortar, and reinforced with and rigidly supported upon structural steel and concrete.

Both the melting and refining chambers are fired, and it will be understood that the design and operation of the firing ports and regenerators, or recuperators, will be in line with good engineering practice.

The invention embraces the provision of a central well 3 in particularly effective arrangement in the melting chamber. In the operation of the furnace the crude glass produced in the melting chamber flows into the bottom of the well, and, rising in the well, forms a column C of molten glass. From the top of such column the crude glass runs into a central outlet, whence it is directed downward into the bath of glass G, maintained in usual way in the refining chamber. In this case the peripherally continuous wall of the well 3 rises from the hearth 4 of the melting chamber, and at the surface of the hearth, the inlets (30) for the crude glass open through such wall. The batch B of glass-forming materials in the melting chamber 2 is borne by the hearth 4, between the vertical side wall of the melting chamber and the vertical side wall of the well within. And it is important to note that the batch of glass-forming materials extend circumferentially of the pool or column C of glass in the well. In effect the column C forms a molten core within the body of the glass-forming materials which are being smelted, and it will be understood that the hot encompassing mass of such materials assists in the maintenance of desired temperature conditions within the well.

As already mentioned, the raw or crude glass entering the bottom of the well rises and forms a pool or column C, and the surface of the pool seeks the same level as the molten material in the body of the batch B. The outlet from the well advantageously consists in a central tube 7, and the open upper end of such tube lies at substantially higher elevation than the inlets 30, but at lower elevation than the normal surface of the pool C. The raw glass entering the bottom of the pool causes an overflow from the top of the pool into the tube 7, and through such tube the glass descends in streams or ribbons R into the body G of molten glass in the refining chamber. In known way the raw glass streaming into the bath G spreads through the body of the bath and is refined, and in the course of normal furnace operation the refined glass moves under the usual bridge-wall 8 into the drawing pool 9, whence it is removed and formed into the desired articles of manufacture.

The glass-forming materials of the batch are introduced to the melting chamber either continuously or periodically, and in either case the materials are spread and distributed upon the surface of the batch. To this end (and for other reasons too) the hearth of the melting chamber is slowly and continuously rotated relatively to the means that deliver such material. Specifically, a hopper 5 is arranged above the melting chamber; the hopper is charged with glass-forming materials, properly prepared and mixed for introduction to the furnace; and the discharge chute of the hopper opens into a vertical spout 6 that extends into the melting chamber, with the outlet of spout positioned immediately above the surface of the batch B. While the batch B slowly rotates, the glass-forming materials are released in regulated quantities from the hopper, and, descending through spout 6, are applied to the surface of the batch moving beneath. Thus, the batch materials are distributed upon the annular bed B in the melting chamber. And as already described, the raw glass, produced of the materials in such bed, flows from the bottom of the bed into the bottom of the well 3; in the well 3 the glass slowly works its way to the surface of the column C; and from the surface of such column the glass flows radially inward to the inlet end of the tube 7, whence it is directed into the batch G and refined. By virtue of this procedure, greater quantities of glass may be prepared per unit of hearth area. The glass is more uniform and its quality superior, it being noted that the well 3 operates to assist and accelerate the purification and refinement of the glass.

Turning to a consideration of certain valuable features of construction, it is to be noted that the elevated melting chamber is made in two sections—an upper section 2a and a lower section 2b. The upper section forms the firing chamber and is rigidly borne upon suitable steel framework (not shown). The lower section, forming the support for the batch B and including the well 3, is mounted for rotation on a horizontal race of rollers or wheels 20. The rollers are trunnioned in a circular raceway 21 that is supported on beams 22, and the rotatable section 2b of the furnace carries rigidly an annular rail 23 that rides the race of rollers 20. The annular rail in turn carries on its upper face a ring-gear 24, and with such gear a driving pinion 25 meshes. The pinion is powerfully driven by a motor 26, and the hearth-section 2b of the furnace is rotated. A gear-box 27, arranged in the line of transmission between motor and pinion, permits regulation of the speed of rotation of such hearth-section.

It will be perceived that the upper, stationary section 2a of the melting chamber includes an annular horizontal wall portion 2c that in assembly extends radially inward and curtains the interval between the meeting edges of the upper and lower sections 2a and 2b. The fuel and air for combustion are introduced to the upper furnace section 2a, and in exemplary way I show firing ports 28 in the side wall of such section. Similarly, firing ports 29 are shown in the side wall of the refining chamber 1. It is important to note that the firing ports 28 extend in tangential direction through the circular wall of the chamber 2a (cf. Fig. IV), with the consequence and effect that the fuel and air directed into the chamber 2a flow in circular course. The burning streams of fuel tend to form a vortex, with combustion advantageously concentrated over the surface of the circumferentially extending batch B.

I propose to use either regenerators or recuperators with my furnace. I prefer regenerators, although (in Fig. 1) I show a recuperator with the furnace. In any event the manner in which I effect and control the removal of the hot waste gases is particularly efficient. Specifically, I provide an outlet duct 10, leading from the refining chamber 1 to a recuperator 11. The products of combustion in the melting chamber are led downward into the refining chamber, and, together with the products of combustion in the refining chamber, flow through the duct 10 to the recuperator 11. The line of escape of the waste gases from the melting chamber 2 is at the center of the vortex-forming streams of burning fuel, and the tube 7 that provides the outlet for the glass from pool C also provides the passage for the escape of the hot waste gases. The advantages of this feature will at once be manifest to those skilled in the art.

The ducts for leading preheated air from the recuperator to the ports 28, 29 of the furnace are not illustrated, the provision of such ducts being, as mentioned above, rather a matter for the engineer than the inventor.

In the operation of any glass furnace, it is the melting chamber and more particularly the hearth of the melting chamber that fails first and requires repair or renewal. When such failure occurs in present practice, the entire furnace is shut down and the repairs or renewals are made. In accordance with my invention, I provide for the removal of the hearth-section 2b as a unit, and immediately make substitution of a new one.

The beams 22 provide ways, upon which the hearth unit 2b may be shifted.

In normal position of assembly with the furnace, the hearth section 2b is blocked up on blocks 12 and cross-beams 13 (Fig. II). When the hearth requires repair or renewal, a section 70 (Fig. 1) of the tube 7 is removed; the blocks and cross-beams 12, 13 are withdrawn, and the hearth section is lowered into such position that its rigid girdle 21 rests immediately on the ways 22, with its vertical walls cleared from the wall portion 2c of the upper section 2a. Then the hearth section is (by means of a winch or other suitable means) moved on the ways from position beneath the stationary upper section 2a, and a new hearth section is brought into place and blocked up into service position. The furnace need be held out of service for only a few hours at most.

It will be understood that the ways 22 may be arranged to extend outward from opposite sides of the refining chamber, as shown in Fig. II. A spare hearth unit will normally be mounted on the rails, as shown in broken lines, ready to be brought into service. The burned-out hearth will be removed to the right of the furnace and the spare hearth will be brought in from the left.

It is contemplated that in some cases the entire melting chamber may be transported on the ways, and, of course, it is permissible to provide rollers or wheels on which the interchangeable furnace units may travel on the ways or rails 22.

The modified structure shown in Figs. III and IV embodies essentially the features of the furnace above described. There are, however, several important refinements and elaborations to be noted. More particularly, the refining chamber 1' is of circular shape and the tube 7' is arranged to deliver the crude glass from the well 3' into the center of the bath in the refining chamber. From such central point of admission, the crude glass is distributed in radial directions throughout the body of the bath. At all points in the periphery of the bath the glass is in refined and uniform condition, ready to be withdrawn and shaped into the articles to be manufactured. At spaced-apart points circumferentially of the chamber I', I provide radially extending feeders 15, whereby a relatively large number of glass-fabricating machines may be supplied by the furnace. The glass in all feeders is in uniformly refined condition.

In further modification the waste gases from the melting and refining chambers are withdrawn through independent ducts 16 and 17, respectively. These ducts may head into common passage (not shown), or they may severally head into independent passages, leading to a system of recuperators or regenerators.

Another elaboration merits particular attention. The well 3' within the melting chamber is provided with a cover 30'; that is, the pool or column of glass within the well is entirely enclosed. No dust, slag, or unmelted glass-forming materials can enter the well and settle upon the molten glass.

It will, of course, be understood that many variations and modifications are permissive, within the terms and intent of the appended claims.

I claim as my invention:

1. A glass furnace including a refining chamber; a melting chamber arranged above said refining chamber, a well for a pool of raw glass arranged centrally in said melting chamber, a rotary hearth formed to support a batch of glass-forming materials in circumferentially extending relation with respect to said well, the side walls of said well rising above the floor of said hearth and including an inlet adjacent to said floor, and an outlet opening from said well at an elevation above said inlet and communicating with said refining chamber below.

2. A glass furnace including a refining chamber, a melting chamber arranged above said refining chamber, a covered well for a pool of raw glass arranged in said melting chamber, a hearth adapted to support a batch of glass-forming materials in circumferentially extending relation with respect to said well, the said walls of said well rising above the floor of said hearth and including an inlet adjacent to said floor, and a passage opening from said covered well at an elevation above said inlet and communicating with said refining chamber below.

3. A glass furnace including a circular refining chamber for a bath of molten glass, said chamber being provided with a plurality of feeders extending outward from the outer side wall of said chamber at circumferentially-spaced apart points, a melting chamber arranged above said refining chamber, and a passage for delivering molten glass from said melting chamber to the center of said refining chamber from which said feeders extend.

4. In a glass furnace including a melting chamber having a rotary hearth provided with a central well for a pool of raw glass, the side wall of said well rising above the surface of the hearth, said hearth adapted to support a batch of glass-forming materials that is of substantial depth, that encompasses the well and that bears laterally upon said side wall of the well, the structure including a port that affords passage for the flow of molten glass from the batch to the well, the well including an outlet for the flow of glass therefrom, and burners arranged to smelt the batch and to maintain the pool of raw glass in molten condition in said chamber.

5. The structure of the next-preceding claim, together with a glass-refining chamber arranged below said melting chamber, said outlet from the well in said melting chamber communicating with said refining chamber and providing a passage for the flow of molten glass from the well to the refining chamber and providing a duct for the delivery of the hot products of combustion from said melting chamber to said refining chamber.

6. A glass furnace including a refining chamber, and a melting chamber, said melting chamber including a roof and a hearth, the hearth being arranged between the roof and the refining chamber, said hearth being mounted for rotation on a circular race of wheels, and means for supporting said race, the supporting means including a plurality of horizontally disposed rails above the refining chamber and providing ways upon which said hearth may be moved radially of its center of rotation from a position between the refining chamber and the roof of the melting chamber, and removable means for holding the hearth in interfitting relationship with the roof, the hearth when the removable means are removed being in a position where it is free to travel along the rails.

SAMUEL A. FORTER.